United States Patent
Zhu

(10) Patent No.: US 11,300,414 B2
(45) Date of Patent: Apr. 12, 2022

(54) ESTIMATED TIME OF ARRIVAL BASED ON HISTORY

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 192 days.

(21) Appl. No.: 16/573,840

(22) Filed: Sep. 17, 2019

(65) Prior Publication Data

US 2021/0080263 A1 Mar. 18, 2021

(51) Int. Cl.
| | |
|---|---|
| *G01C 21/26* | (2006.01) |
| *B60W 30/18* | (2012.01) |
| *B60W 50/14* | (2020.01) |
| *G05D 1/00* | (2006.01) |

(Continued)

(52) U.S. Cl.
CPC .............. *G01C 21/26* (2013.01); *B60W 30/18* (2013.01); *B60W 50/14* (2013.01); *G05D 1/0088* (2013.01); *B60W 2050/146* (2013.01); *B60W 2400/00* (2013.01); *B60W 2720/106* (2013.01); *G05D 2201/0213* (2013.01); *H04W 4/024* (2018.02); *H04W 4/029* (2018.02)

(58) Field of Classification Search
CPC ....... G01C 21/26; B60W 30/18; B60W 50/14; B60W 2050/146; B60W 2400/00; B60W 2720/106; G05D 1/0088; H04W 4/024
See application file for complete search history.

(56) References Cited

U.S. PATENT DOCUMENTS

| | | | | |
|---|---|---|---|---|
| 2015/0348410 | A1* | 12/2015 | Min | G08G 1/127 701/117 |
| 2016/0033289 | A1* | 2/2016 | Tuukkanen | G01C 21/34 701/522 |
| 2017/0316696 | A1* | 11/2017 | Bartel | G06Q 10/0631 |

FOREIGN PATENT DOCUMENTS

| | | | | |
|---|---|---|---|---|
| DE | 19928082 | A1 * | 12/2000 | G08G 1/0104 |
| DE | 102007049509 | A1 * | 4/2009 | G01C 21/26 |
| KR | 20160004502 | A * | 1/2016 | |

(Continued)

OTHER PUBLICATIONS

J.Miller et al., "Determining Time to Traverse Road Sections based on Mapping Discrete GPS Vehicle Data to Continuous Flows." Conference Paper, Jul. 2010 (Year: 2010).*

(Continued)

*Primary Examiner* — Peter D Nolan
*Assistant Examiner* — Tanya C Sienko
(74) *Attorney, Agent, or Firm* — Womble Bond Dickinson (US) LLP

(57) ABSTRACT

In one embodiment, an autonomous driving vehicle (ADV) drives autonomously on a route for a plurality of drives. For each drive of the plurality of drives, a position of the ADV is recorded at time intervals along the route, resulting in one or more recorded positions. Each of the recorded positions indicates the position of the ADV on the route at a corresponding time interval. One or more average positions at each time interval is determined, as well as an average total drive time to complete the route, based on the recorded drive data. An amount of time left to complete the route is estimated, when the ADV drives on the route, based on difference between a) the average total drive time, and b) the time interval corresponding to the average position that the ADV is located at.

20 Claims, 11 Drawing Sheets

(51) Int. Cl.
*H04W 4/024* (2018.01)
*H04W 4/029* (2018.01)

(56) References Cited

FOREIGN PATENT DOCUMENTS

| KR | 101597772 B1 | * | 2/2016 | |
|---|---|---|---|---|
| KR | 20160086784 A | * | 7/2016 | ............. G08G 1/127 |

OTHER PUBLICATIONS

Stack Overflow discussion, "Algorithm about ETA (Estimated time of arrival)" posted Jan. 6, 2016, relevant answers Jan. 6, 2016. (Year: 2016).*
C. Toombs "Maps v9.19 Introduces New Driving Mode With Traffic Updates And ETAs, Audio Toggle For Navigation, And Timeline Settings [APK Download + Teardown]", Jan. 12, 2016, pp. 1-6. (Year: 2016).*
P. Bevington and D. Robinson, "Data Reduction and Error Analysis for the Physical Sciences" 2nd edition WCB/McGraw-Hill co. 1992 p. 58 (Year: 1992).*
"Navigation—How to show ETA, distance remaining etc." Prius Plug-in chat group, question and answer posted Jan. 16, 2018. (Year: 2018).*
"NIO EP9 Autonomous Lap Record—Fastest Self-Driving Car Yet", YouTube video, accessible at https://youtu.be/dAQ_7fQu8IQ, posted Mar. 14, 2017. See minutes 3.16-4.22 when the car does a lap by itself around the racetrack (Year: 2017).*

* cited by examiner

600

601 — AUTONOMOUSLY DRIVING AN AUTONOMOUS DRIVING VEHICLE (ADV) ON A ROUTE FOR A PLURALITY OF DRIVES

602 — FOR EACH DRIVE OF THE PLURALITY OF DRIVES, RECORDING, AT ONE OR MORE TIME INTERVALS, A POSITION OF THE ADV ALONG THE ROUTE, RESULTING IN ONE OR MORE RECORDED POSITIONS, EACH INDICATING THE POSITION OF THE ADV ON THE ROUTE AT A CORRESPONDING TIME INTERVAL

603 — DETERMINING ONE OR MORE AVERAGE POSITIONS OF THE ADV CORRESPONDING TO EACH TIME INTERVAL, BASED ON THE ONE OR MORE RECORDED POSITIONS

604 — DETERMINING, BASED ON THE PLURALITY OF DRIVES, AN AVERAGE TOTAL DRIVE TIME TO COMPLETE THE ROUTE

605 — WHEN THE ADV DRIVES ON THE ROUTE, THEN ESTIMATING AN AMOUNT OF TIME LEFT TO COMPLETE THE ROUTE, BASED ON DIFFERENCE BETWEEN A) THE AVERAGE TOTAL DRIVE TIME, AND B) THE TIME INTERVAL CORRESPONDING TO THE ONE OF THE ONE OR MORE AVERAGE POSITIONS THAT THE ADV IS LOCATED AT

FIG. 6

ESTIMATED TIME OF ARRIVAL BASED ON HISTORY

TECHNICAL FIELD

Embodiments of the present disclosure relate generally to operating autonomous vehicles. More particularly, embodiments of the disclosure relate to estimated time of arrival of an autonomous vehicle on a route based on history.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

Estimating time of arrival or time until arrival (ETA) for an autonomous driving vehicle can present challenges. Distance and speed provides only some of the information necessary to accurately determine ETA, even if there is no traffic. Further, trying to calculate traffic conditions and factoring those conditions into the ETA calculation is complicated and can be error prone because traffic can fluctuate from one situation to another. Autonomous driving vehicles can benefit from an accurate process that determines ETA.

BRIEF DESCRIPTION OF THE DRAWINGS

Embodiments of the disclosure are illustrated by way of example and not limitation in the figures of the accompanying drawings in which like references indicate similar elements.

FIG. 6 shows a flow diagram illustrating a process of estimating a time until arrival, according to one embodiment.

DETAILED DESCRIPTION

Figure 1:
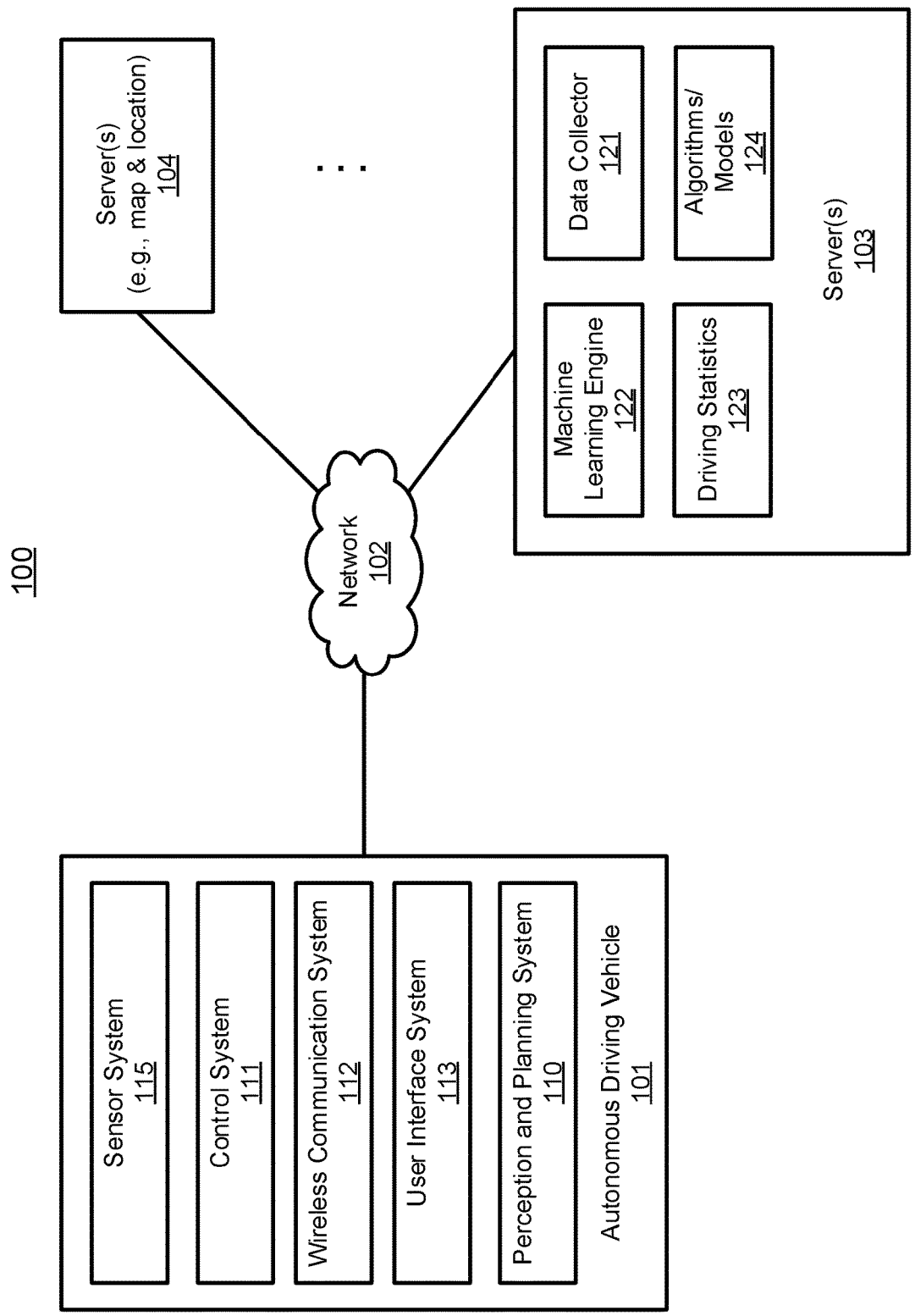
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Autonomous driving vehicles can benefit from an accurate process that determines ETA without considering the speed limit or distance of a route. Distance and speed limits are only some of the factors that determine ETA. For example, left turns, right turns, lane changes, u-turns, intersections, crosswalks, speed bumps, and other traffic conditions and driving actions play a role in an ADV's drive time along a route. Further, different driving operations (e.g., a lane change) at different locations along a route can have varying impacts. Thus, calculating an estimated time until arrival is difficult to estimate.

According to some embodiments, a method for autonomously driving a vehicle with estimated time of arrival is described in the present disclosure. The method can include autonomously driving an autonomous driving vehicle (ADV) on a route for a plurality of drives to gather data for each drive. For each drive, a position of the ADV along the route is recorded at one or more time intervals. The recorded positions each indicate the position of the ADV on the route at a corresponding time interval. For example, if the interval of time is 1 minute, the first drive can have associated data that includes a) a first position at 1 minute into the route, b) a second position at 2 minutes into the route, and so on, until the drive completes. This can be repeated for a second drive, a third drive, and so on, while ADV positions are gathered at the specified time interval (e.g., every 1 minute).

One or more average positions, each position corresponding to each time interval, is determined based on the recorded positions of the ADV along the route. For example, if at each third minute into each drive, the vehicle was located at different positions, an average position is calculated based on the different positions (e.g., through addition and division). This average position indicates an average of where the ADV was located on the different drives. Going back to the example, this would indicate an average position of the ADV on the route at the third minute, or third time interval, if the interval is 1 minute.

An average total drive time to complete the route is determined based on the plurality of drives. When the ADV drives on the route at a later time, then the ADV can estimate an amount of time left to complete the route, based on difference between a) the average total drive time, and b) the time interval corresponding to the one of the one or more average positions that the ADV is located at.

In such a manner, the method can generate an estimated time until arrival based on historic data that is independent of vehicle speed limit and route length. The method is also computationally efficient, only requiring simple calculations at infrequent periods (e.g., when the vehicle has reached one of the average positions along the route). Additional aspects of the disclosure are described.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
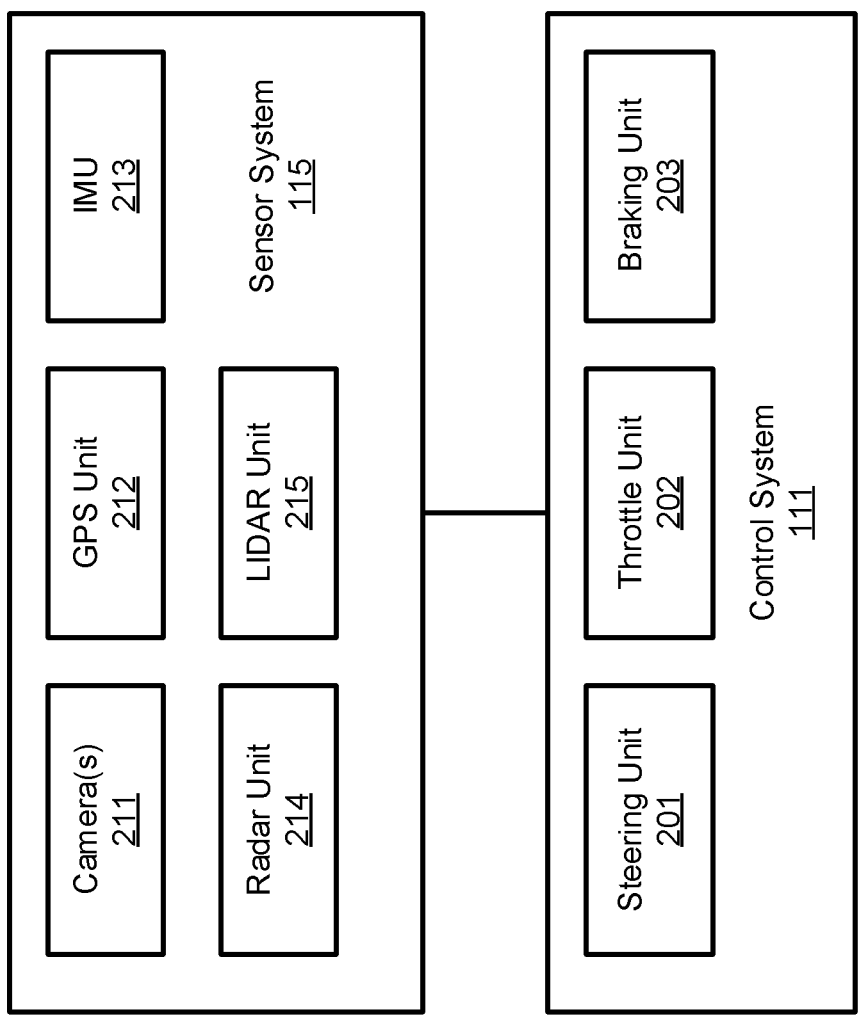
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS) (not shown). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, algorithms 124 may include an algorithm or data structure for estimating time of arrival (ETA) of various routes based on driving history of the routes by a large amount of driving statistics of various vehicles. Algorithms 124 can then be uploaded on ADVs to be utilized during autonomous driving in real-time, for example, by providing ETA to the destination given the current location of a particular route.

Figure 3A:
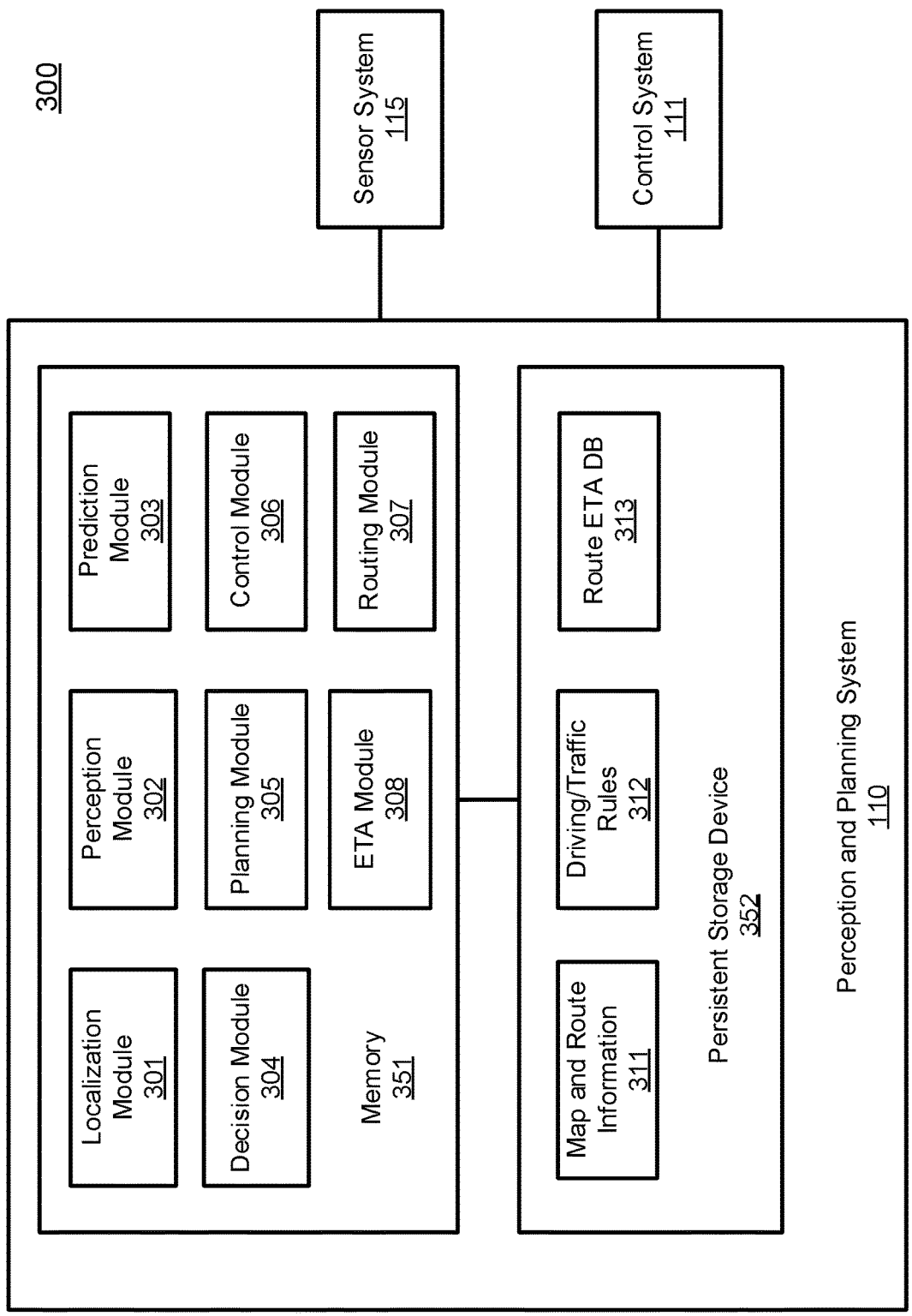
FIGS. 3A-3B are block diagrams illustrating an example of a perception and planning system used with an autonomous vehicle according to one embodiment.
Figure 3B:
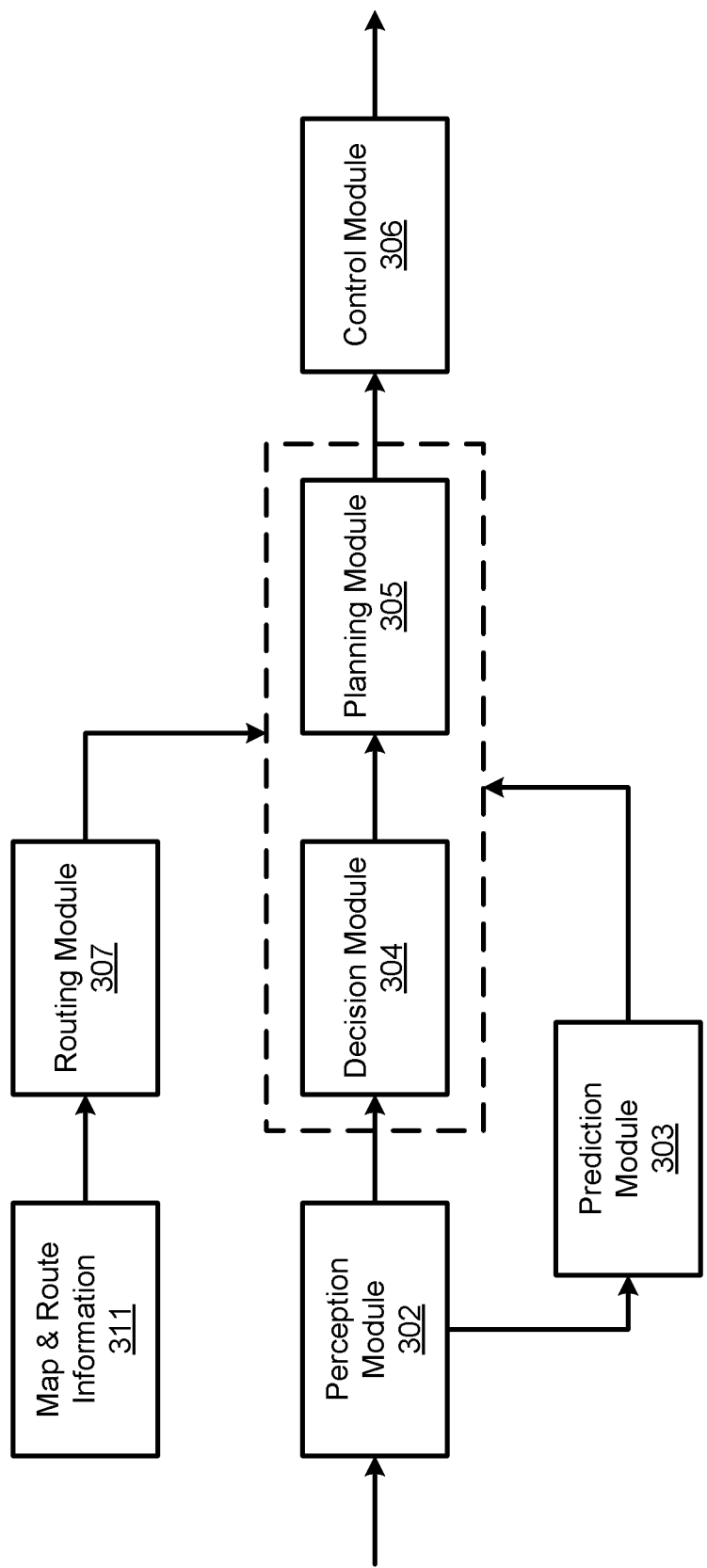

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and ETA module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection.

If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

According to one embodiment, ETA module 308 is configured to estimate the time of arrival of the destination of a particular route given the current location of the ADV. When ADV 300 is driving a particular route, such as a particular bus route from a predetermined starting location to a predetermined destination, a route ETA data structure corresponding to the route is identified and loaded into the memory, which may be stored in persistent storage device 352 as part of route ETA DB 313. ETA DB 313 may be created based on a large amount of driving history of the same route by a large number of vehicles. For example, ETA DB 313 may be created by a data analytics system such as server 103.

Figure 4:
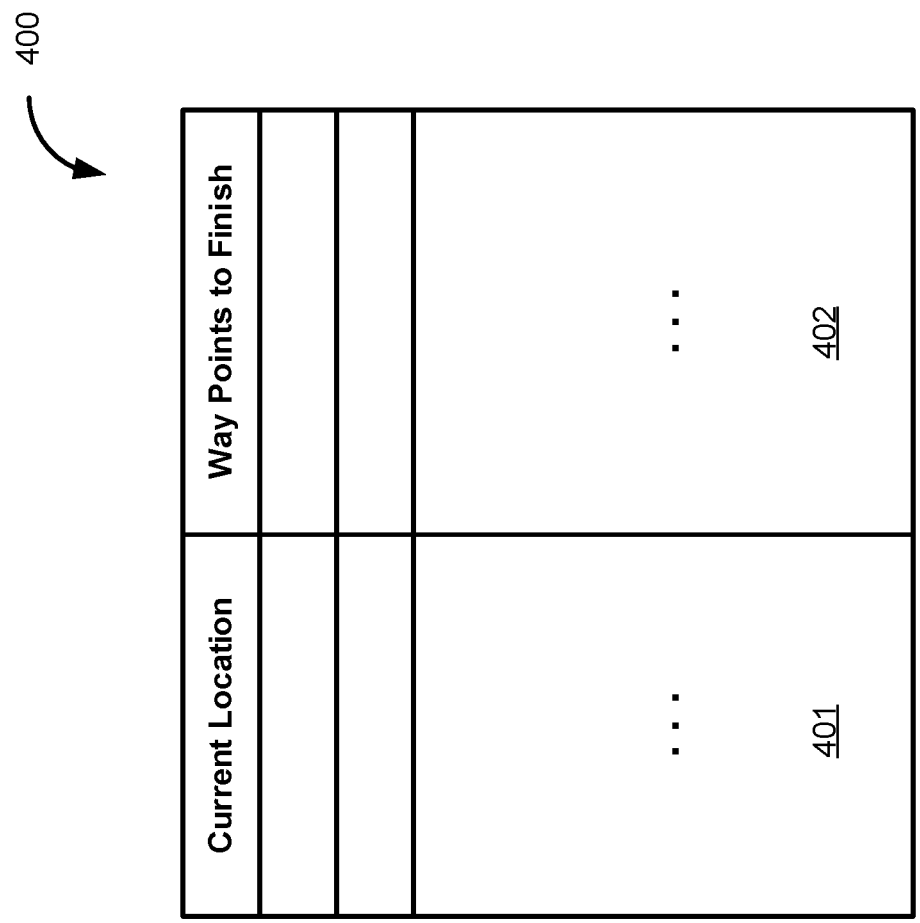
FIG. 4 is a block diagram illustrating architecture of a route ETA data structure according to one embodiment.

FIG. 4 is a block diagram illustrating an example of route ETA DB 313 corresponding to a particular route. Referring to FIGS. 3A-3B and 4, during driving according to the route, given a current location of the ADV provided by localization module 301, ETA module 308 performs a lookup operation in route ETA data structure 400 based on current location 401 to locate a matching entry matching the current location. ETA data structure 400 includes a number of mapping entries and each mapping entry maps a particular location 401 to a number of way points until finish 402, where way points to finish 402 represents the ETA until reaching the destination of the route. Thus, based on the current location 401, the corresponding ETA can be determined based on data 402 obtained from the matching entry.

Figure 5:
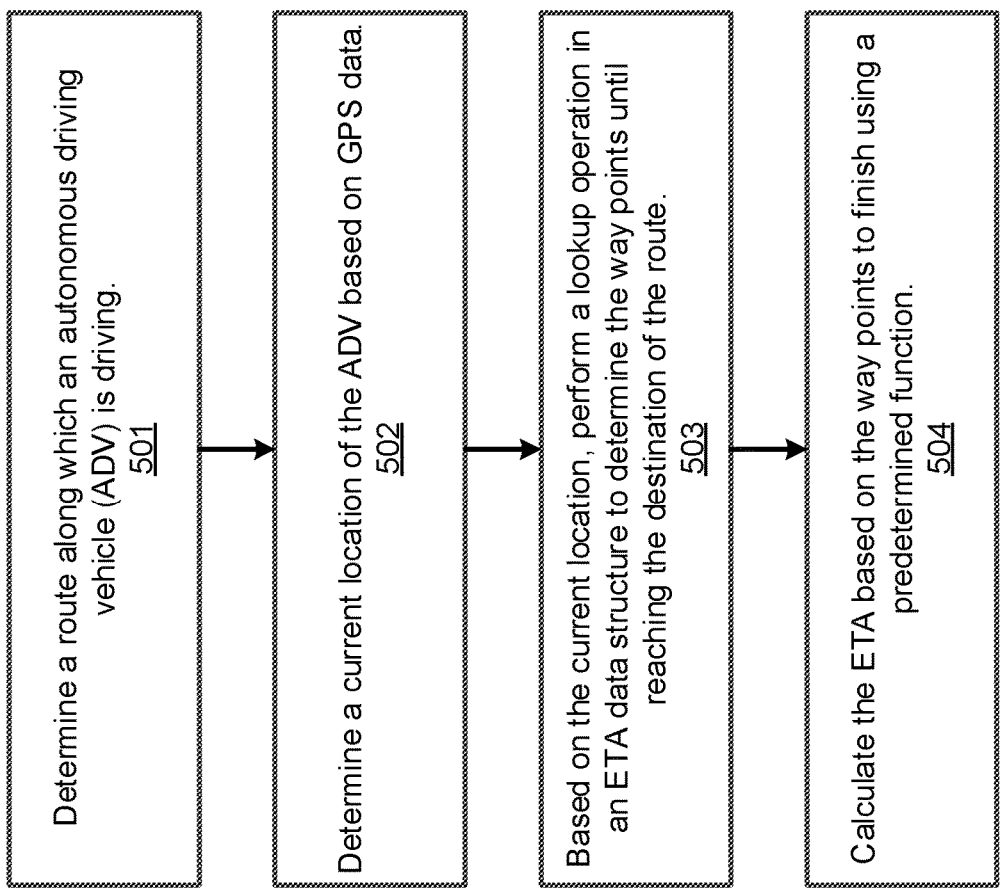
FIG. 5 is a flow diagram illustrating an example of a process for estimate time of arrival according to one embodiment.

FIG. 5 is a flow diagram illustrating an example of a process for estimating ETA according to one embodiment. Process 500 may be performed by processing logic which may include software, hardware, or a combination thereof.

For example, process 500 may be performed by ETA module 308. Referring to FIG. 5, at block 501, processing logic determines a route along which an ADV is driving from a starting location to a destination. At block 502, a current location of the ADV is determined based on GPS data provided by a GPS sensor mounted on the ADV. At block 503, based on the current location, processing logic performs a lookup operation in a route ETA data structure to obtain the way points until reaching the destination. At block 504, the ETA is calculated based on the way points using a predetermined function.

Figure 9:
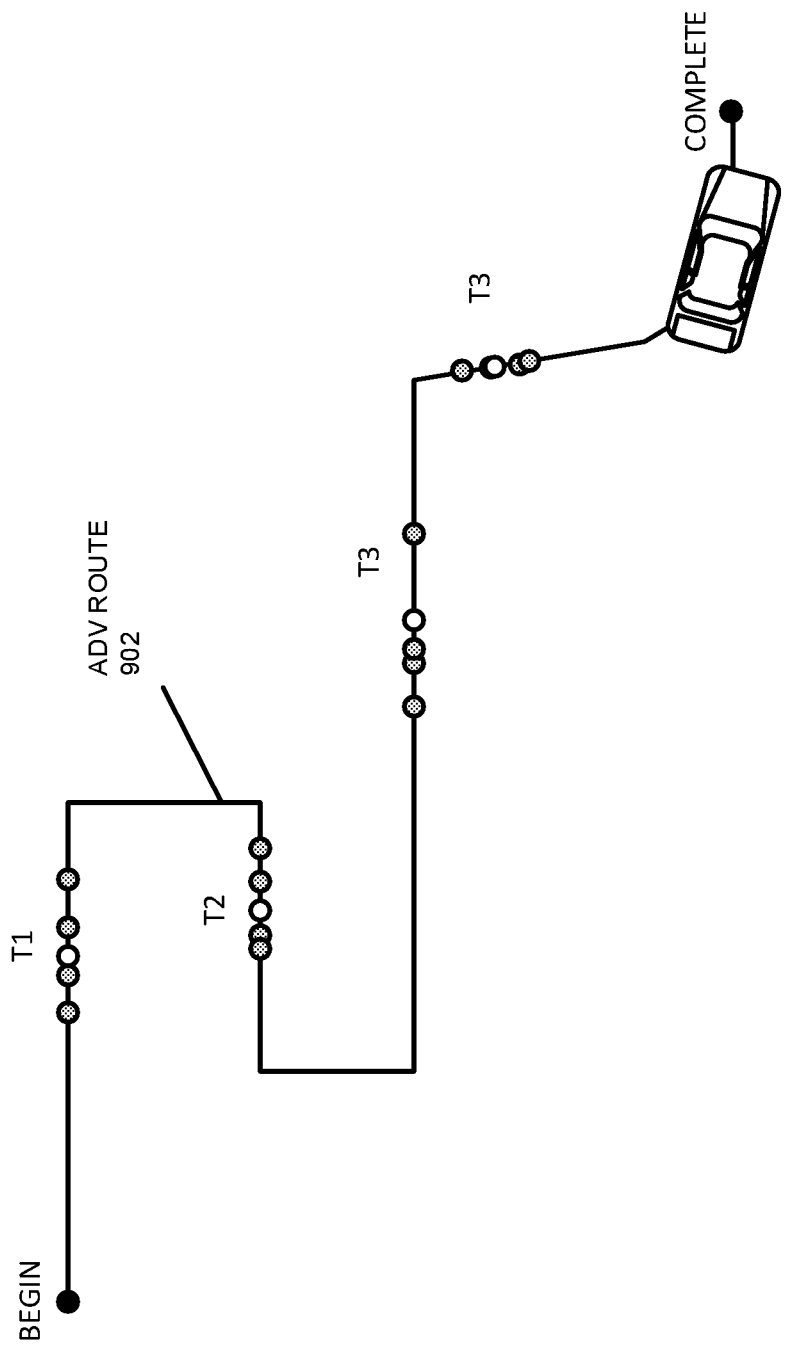
FIG. 9 shows an example of an ADV on a route, according to one embodiment.

A process 600 is shown in FIG. 6 that autonomously drives a vehicle with an estimated time of arrival according to one embodiment. At block 601, the process includes autonomously driving an autonomous driving vehicle (ADV) on a route for a plurality of drives, each drive here being a completion of the route. The route can be a loop that ends where the route begins, for example, route 704 shown in FIG. 7, or an open route as shown in FIG. 9, that does not end at the beginning point of the route.

The ADV can be driven on the same route for a plurality of drives to gather data relating to each drive. In one embodiment, the ADV drives on the same route at least 5 times. In another embodiment, the ADV drives on the same route more than 10 times. The greater the number of drives, the more accurate the process can be in estimating a time until arrival (ETA).

Figure 7:
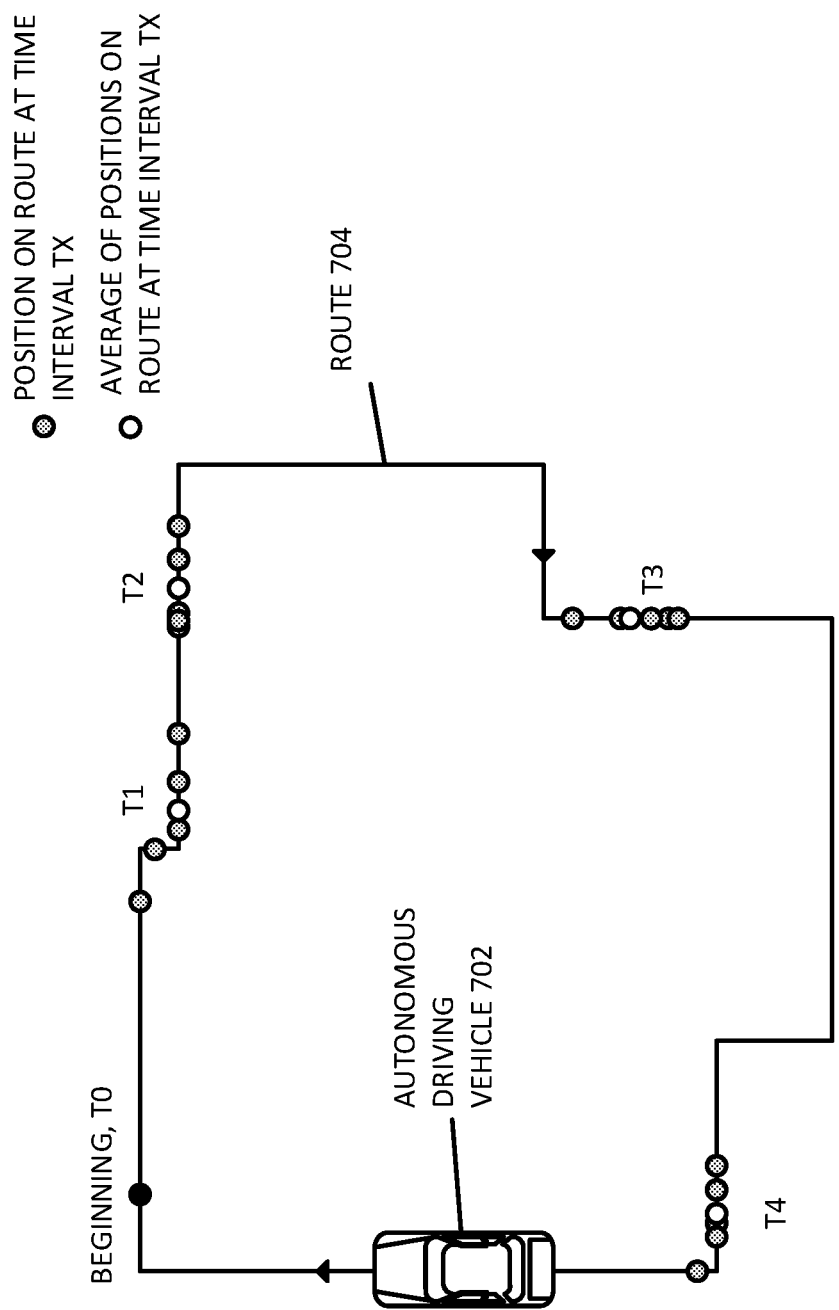
FIG. 7 shows an example of an ADV recording positions at time intervals along a route, according to one embodiment.

Referring back to FIG. 6, at block 602, for each drive of the plurality of drives, the process includes recording, at one or more time intervals, a position of the ADV along the route, resulting in one or more recorded positions, each indicating the position of the ADV on the route at a corresponding time interval. For example, FIG. 7 shows an ADV 702 that drives a route 704 a plurality of times. An interval of time can be any specified time interval, for example, 1 minute, 2 minutes, 5 minutes, 10 minutes, etc. Once determined, however, the interval is common for each drive.

For example, assuming that the time interval is 1 minute. In a first drive, the ADV 702 will have a first position on the route at time T1 (1 minute into the drive), a second location at time T2 (2 minutes into the drive), a third location at T3 (3 minutes into the drive), and a fourth location at time T4 (4 minutes into the drive). This process of gathering position for each drive at each time interval is continued during each drive, to gather a plurality of positions at each time interval. It should be understood that, although FIG. 7 shows an example having only four time intervals, in some routes, there could be only two time intervals (and one point between the beginning and end) while on other routes, there can be over a hundred time intervals. The number of time intervals can vary based on application and route.

Referring back to FIG. 6, at block 603, the process includes determining one or more average positions of the ADV corresponding to each time interval, based on the one or more recorded positions. For example, as shown in FIG. 7, an average position of the ADV along the route can be generated for each time interval (e.g., at the 1-minute mark, the 2-minute mark, and so on). The average position at each time interval can be calculated, for example, based on addition and division.

Further, it should be expected that, some drives on the same route might take a longer or shorter amount of time to complete than others. In some cases, it is possible that a drive has a different number of time intervals than other drives on the same route. For example, going back to the previous example, if one of the drives took particularly longer than the other drives, the ADV could have still been in route at the 5 minute mark. In such a case, there could have been a fifth location on the route at time T5, for the long drive. The process can average this location at T5 with a finish position (or extrapolated position beyond the finish) of the other drives, since they finished the route earlier. Similarly, if one of the drives was faster than the others and finished before time T4, then the process can use the finish position (or extrapolated position beyond the finish) of the fast drive to average with the rest of the drives at time T4.

Referring back to FIG. 6, at block 604, the process includes determining, based on the plurality of drives, an average total drive time to complete the route. For example, assuming a first drive took a total of 4:39, a second drive took a total of 4:02, a third drive took a total of 4:20, a fourth drive took a total of 4:55, and a fifth drive took a total of 4:50 to complete. The total average time can be calculated as an average of the drive times, which in this example, would come to 4 minutes and 33 seconds.

In one embodiment, prior to determining the one or more positions along the route at the one or more intervals of time, a drive with a slowest drive time and/or a drive with a fastest drive time from the plurality of drives is removed from the gathered data, or simply ignored at blocks 603 and 604. This can remove outliers that might have been caused, for example, by anomalies such as a car accident (causing heavier-than-usual traffic) or a holiday (causing lighter-than-usual traffic). Thus, each of the average positions determined at block 603 would ignore data gathered from the fastest drive and/or slowest drive. Similarly, the fastest drive and/or slowest drive would be ignored when finding the average total drive time of the route at block 604.

In one embodiment, the drive with the slowest drive time and the drive with the fastest drive time is removed only if they deviate from remaining drives of the plurality of drives by a threshold deviation amount. If the fastest and/or slowest drive times are very close to the other remaining times, then they represent data points that are not necessarily outliers, and using them can improve the reliability of the results (due to more data points). Thus, in such cases, it might not be advantageous to ignore them. By using a threshold to determine whether or not to discard the fastest and/or slowest drive times, the process can discard only the outlier data. Such a threshold amount can be pre-determined through experimentation and test.

At block 605, the process includes estimating, when the ADV drives on the route, an amount of time left to complete the route, based on difference between a) the average total drive time, and b) the time interval corresponding to the one of the one or more average positions that the ADV is located at.

Figure 8:
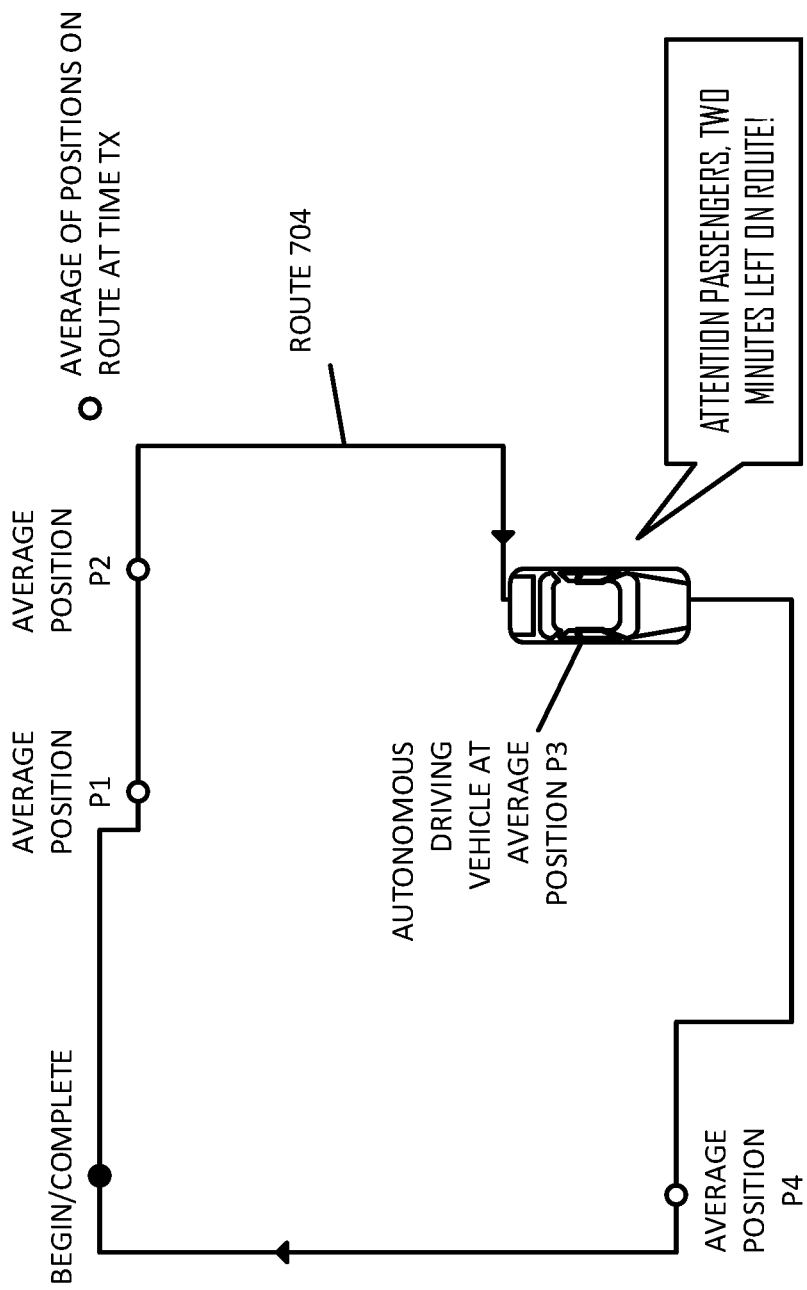
FIG. 8 shows an example of an ADV driving along a route and determining an ETA, according to one embodiment.

For example, referring to FIG. 8, each of the average positions P1-P4 represent an average of the position of the ADV along the route at time intervals T1-T4, respectively. P1 is the average position of the ADV calculated from the positions of the ADV on the plurality of drives at time T1 (e.g., at 1 minute). P2 is the average position of the ADV calculated from the positions of the ADV on the plurality of drives at time T2 (e.g., at 2 minutes), and so on. When the ADV reaches each average position (e.g., P3), then the process can estimate the time remaining by calculating difference between a) the average total drive time (e.g., 4 minutes and 33 seconds) and the number of intervals of time (3 minutes) corresponding to average position P3. Thus, in the current example, the estimated time until arrival could be 4:33−3:00=1 minute and 33 seconds.

In one embodiment, the gathered drive data can be first divided into different sets, for example, based on windows of time. In such a manner, the process can generate different sets of average positions for different times of day where traffic tends to change, where each set of average positions is generated based on the drives that fall in a particular time window. For example, a first set of average positions can be generated for rush hour based on rush hour drives. A second set of positions can be generated for mid-day hours based on mid-day drives. A third set can be generated for evening hours, and so on. The average positions, corresponding time intervals, and average completion times of each set of the time window can then be applied to a drive that occurs within the time window. For example, if the ADV is driving at rush hour, the estimated time until arrival can be determined using the average positions, corresponding time intervals, and average completion times calculated from the drives gathered during rush hour.

As described, the route can be a loop, as shown in FIG. 7 and FIG. 8, or it can be an open path, as shown in FIG. 9. In one embodiment, the ADV can be a bus or other automobile that repeats the same route regularly. In such a case, the ADV can advantageously generate a large data set along the same route.

Figure 10:
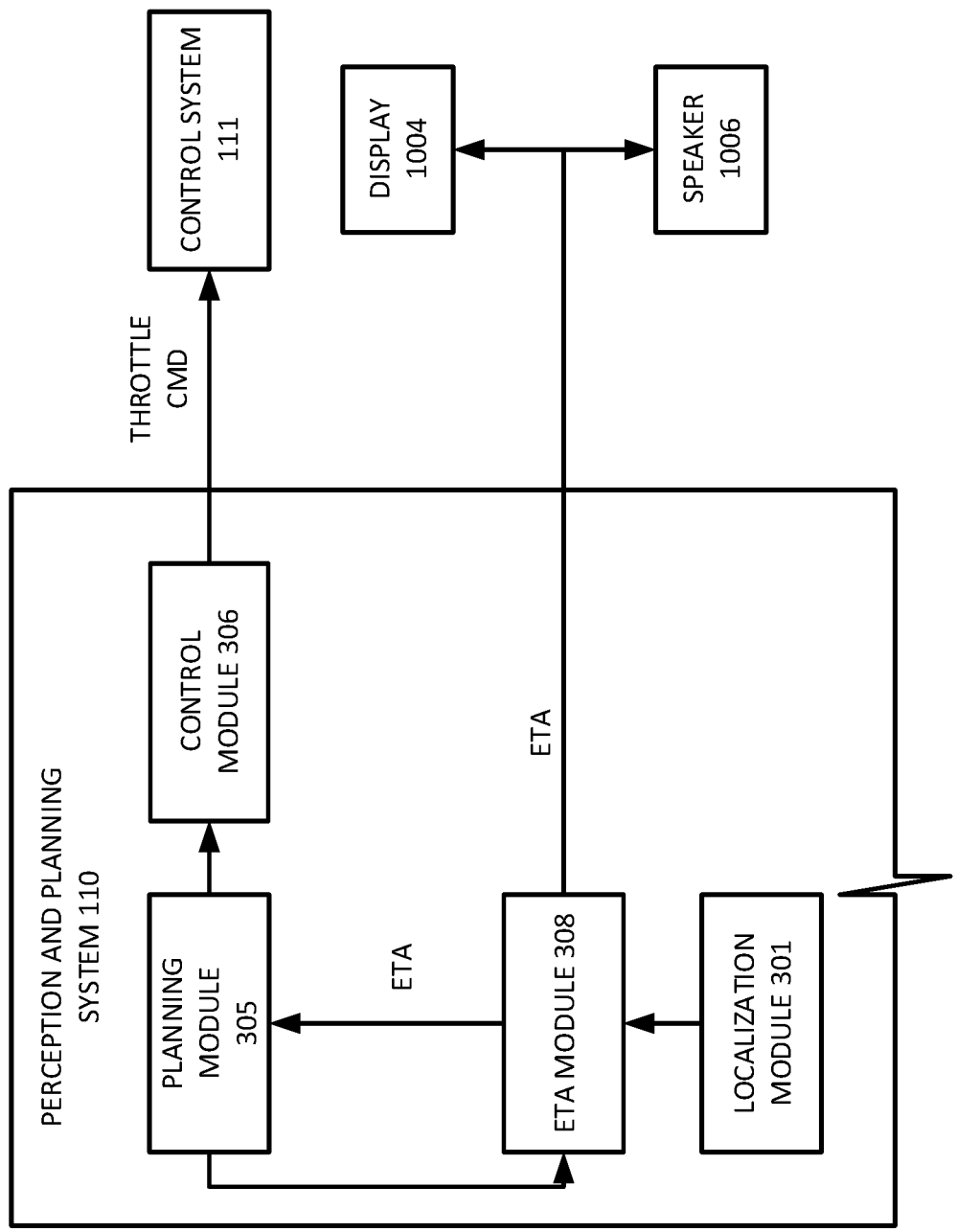
FIG. 10 shows an ADV with an ETA module, according to one embodiment.

Referring now to FIG. 10, perception and planning system 110 includes an estimated time until arrival (ETA) module 308 that receives location data of the ADV from localization module 301 and/or planning module 305. The ETA module can also receive route information from planning module 305. The ETA module can determine, based on the route information and/or location data, when the ADV is on route, and when the ADV is located at one of the average positions that corresponds to a time interval (e.g., ADV located at P3 corresponding to time interval T3). The ETA module can generate an estimated time until arrival corresponding to that position, as discussed in other sections.

In one embodiment, the ETA module can cause the ETA to be displayed on a display 1004 which can be read by passengers of the ADV. Alternatively or additionally, the ETA can be indicated through a loudspeaker 1006, for example, "Five minutes until we reach our destination", or "3 minutes remaining in the tour". Thus, passengers of the ADV can be notified as to what the ETA is. The ETA module can, rather also determine an estimated time of arrival based on the estimated time until arrival and the current time. For example, if the time is 5:00 pm, and the estimated time until arrival is 12 minutes and 33 seconds, then the estimated time of arrival can be calculated by adding the amount of time left to complete the route to the current time, which in this example, would be 5:12:33. In some applications, the ETA module can round up or round down to the nearest minute.

In one embodiment, the ETA module 308 can modify a throttle command based on the amount of time left to complete the route, if the amount of time left to complete the route indicates that the ADV is behind schedule. The schedule here can be based on an expected route completion time and/or the average total drive time of the route.

The ETA module 308 can communicate the ETA to planning module 305. The planning module, or the ETA module can determine that the ADV is behind schedule (e.g., based on having taken longer than expected to reach the current position), and plan to drive faster along the route. The planning module 305 can provide an increased speed or other planning data to control module 306. The control module can, in turn, can determine a modified throttle command based on the planning data, and provide a higher throttle command to the control system 111. This can help the ADV reach a destination and complete the path faster.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method for autonomously driving a vehicle with estimated time of arrival, comprising:
    autonomously driving an autonomous driving vehicle (ADV) on a route for a plurality of drives;
    for each drive of the plurality of drives, recording, at one or more time intervals, a position of the ADV along the route, resulting in one or more recorded positions, each indicating the position of the ADV on the route at a corresponding time interval;
    determining one or more average positions of the ADV corresponding to each time interval, based on the one or more recorded positions;
    determining, based on the plurality of drives, an average total drive time to complete the route; and
    estimating an amount of time left to complete the route based on a difference between the average total drive time and one of the one or more time intervals that corresponds to the one of the one or more average positions that a target ADV is currently located at.

2. The method of claim 1, further comprising removing a drive with a slowest drive time and a drive with a fastest drive time from consideration in determining the one or more average positions and determining the average total drive time.

3. The method of claim 2, wherein the drive with the slowest drive time and the drive with the fastest drive time are ignored only if they deviate from remaining drives of the plurality of drives by a threshold deviation amount.

4. The method of claim 1, wherein the amount of time left to complete the route is indicated on a display.

5. The method of claim 1, wherein the amount of time left to complete the route is indicated through a speaker.

6. The method of claim 1, wherein the route is a loop that ends where the route begins.

7. The method of claim 1, further comprising modifying a throttle command based on the amount of time left to complete the route, if the amount of time left to complete the route indicates that the ADV is behind schedule.

8. A non-transitory machine-readable medium having instructions stored therein, which when executed by a processor, cause the processor to perform operations, the operations comprising:
    autonomously driving an autonomous driving vehicle (ADV) on a route for a plurality of drives;
    for each drive of the plurality of drives, recording, at one or more time intervals, a position of the ADV along the route, resulting in one or more recorded positions, each indicating the position of the ADV on the route at a corresponding time interval;
    determining one or more average positions of the ADV corresponding to each time interval, based on the one or more recorded positions;
    determining, based on the plurality of drives, an average total drive time to complete the route; and
    estimating an amount of time left to complete the route based on a difference between the average total drive time and one of the one or more time intervals that corresponds to the one of the one or more average positions that a target ADV is currently located at.

9. The machine-readable medium of claim 8, wherein the operations further comprise removing a drive with a slowest drive time and a drive with a fastest drive time from consideration in determining the one or more average positions and determining the average total drive time.

10. The machine-readable medium of claim 9, wherein the drive with the slowest drive time and the drive with the fastest drive time are ignored only if they deviate from remaining drives of the plurality of drives by a threshold deviation amount.

11. The machine-readable medium of claim 8, wherein the amount of time left to complete the route is indicated on a display.

12. The machine-readable medium of claim 8, wherein the amount of time left to complete the route is indicated through a loudspeaker.

13. The machine-readable medium of claim 8, wherein the route is a loop that ends where the route begins.

14. The machine-readable medium of claim 8, further comprising modifying a throttle command based on the amount of time left to complete the route, if the amount of time left to complete the route indicates that the ADV is behind schedule.

15. A data processing system, comprising:
    a processor; and
    a memory coupled to the processor to store instructions, which when executed by the processor, cause the processor to perform operations, the operations including
    autonomously driving an autonomous driving vehicle (ADV) on a route for a plurality of drives;
    for each drive of the plurality of drives, recording, at one or more time intervals, a position of the ADV along the route, resulting in one or more recorded positions, each indicating the position of the ADV on the route at a corresponding time interval;
    determining one or more average positions of the ADV corresponding to each time interval, based on the one or more recorded positions;
    determining, based on the plurality of drives, an average total drive time to complete the route; and
    estimating an amount of time left to complete the route based on a difference between the average total drive time and one of the one or more time intervals that correspond to the one of the one or more average positions that a target ADV is currently located at.

16. The system of claim 15, wherein the operations further comprise removing a drive with a slowest drive time and a drive with a fastest drive time from consideration in determining the one or more average positions and determining the average total drive time.

17. The system of claim 16, wherein the drive with the slowest drive time and the drive with the fastest drive time are ignored only if they deviate from remaining drives of the plurality of drives by a threshold deviation amount.

18. The system of claim 15, wherein the amount of time left to complete the route is indicated on a display.

19. The system of claim 15, wherein the amount of time left to complete the route is indicated through a loudspeaker.

20. The system of claim 15, further comprising modifying a throttle command based on the amount of time left to complete the route, if the amount of time left to complete the route indicates that the ADV is behind schedule.

* * * * *